(12) United States Patent
Miyazaki

(10) Patent No.: US 11,787,027 B2
(45) Date of Patent: Oct. 17, 2023

(54) IMPACT ROTARY TOOL

(71) Applicant: Panasonic Intellectual Property Management Co., Ltd., Osaka (JP)

(72) Inventor: Hiroshi Miyazaki, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 16/474,956

(22) PCT Filed: Nov. 30, 2017

(86) PCT No.: PCT/JP2017/043086
§ 371 (c)(1),
(2) Date: Jun. 28, 2019

(87) PCT Pub. No.: WO2018/142741
PCT Pub. Date: Aug. 9, 2018

(65) Prior Publication Data
US 2019/0321949 A1    Oct. 24, 2019

(30) Foreign Application Priority Data

Jan. 31, 2017    (JP) ................................ 2017-016136

(51) Int. Cl.
*B25B 23/147*    (2006.01)
*B25B 21/02*    (2006.01)
(Continued)

(52) U.S. Cl.
CPC ........ *B25B 23/1475* (2013.01); *B23P 19/065* (2013.01); *B25B 21/02* (2013.01);
(Continued)

(58) Field of Classification Search
CPC ... B23P 19/065; B25B 23/1475; B25B 21/02; G05B 19/0405; G05B 19/185; Y10T 29/49947
(Continued)

(56) References Cited

U.S. PATENT DOCUMENTS 6,687,567 B2    2/2004    Watanabe
6,945,337 B2    9/2005    Kawai et al.
(Continued)

FOREIGN PATENT DOCUMENTS

EP    1982798 A2    10/2008
JP    2012-200809 A    10/2012

OTHER PUBLICATIONS

Extended European Search Report issued in corresponding European Patent Application No. 17894843.6, dated Jan. 28, 2020.
(Continued)

*Primary Examiner* — Thomas Raymond Rodgers
(74) *Attorney, Agent, or Firm* — McDermott Will & Emery LLP

(57) ABSTRACT

A mode setting unit sets a parameter setting mode or a work mode. A parameter setting unit sets a plurality of parameter values in the parameter setting mode. A torque estimation unit calculates a tightening torque value by using a detection result from an impact detection unit. In a work mode, a control unit stops a rotation of a motor based on the plurality of parameter values set by the parameter setting unit and in accordance with the tightening torque value calculated by the torque estimation unit. In the parameter setting mode, a work information storage unit stores the tightening torque value calculated by the torque estimation unit during a tightening work according to a user operation, and the
(Continued)

parameter setting unit sets the plurality of parameter values based on the tightening torque value stored in the work information storage unit.

4 Claims, 8 Drawing Sheets

(51) Int. Cl.
    *B23P 19/06*     (2006.01)
    *G05B 19/04*     (2006.01)
    *G05B 19/18*     (2006.01)

(52) U.S. Cl.
    CPC ....... *G05B 19/0405* (2013.01); *G05B 19/182* (2013.01); *Y10T 29/49947* (2015.01)

(58) Field of Classification Search
    USPC .......................................................... 173/179
    See application file for complete search history.

(56) References Cited

U.S. PATENT DOCUMENTS

| | | |
|---|---|---|
| 9,089,956 B2 | 7/2015 | Arimura et al. |
| 2003/0149508 A1 | 8/2003 | Watanabe |
| 2005/0109519 A1 | 5/2005 | Kawai et al. |
| 2009/0084568 A1* | 4/2009 | Arimura ............. B25B 23/1405 173/104 |
| 2016/0325414 A1 | 11/2016 | Mizuno et al. |

OTHER PUBLICATIONS

International Search Report issued in corresponding International Patent Application No. PCT/JP2017/043086, dated Feb. 27, 2018, with English translation.

\* cited by examiner

FIG.3

| MODE | | CONTENTS |
|---|---|---|
| PARAMETER SETTING MODE | AUTOMATIC SETTING MODE | MODE IN WHICH INITIAL VALUES OF A PLURALITY OF PARAMETERS ARE AUTOMATICALLY SET BASED ON AN ESTIMATED TORQUE VALUE CALCULATED IN A TIGHTENING WORK PERFORMED ACCORDING TO A USER OPERATION |
| | ADJUSTMENT MODE | MODE IN WHICH A USER ADJUSTS AND SETS VALUES OF A PLURALITY OF PARAMETERS BASED ON A TIGHTENING TORQUE VALUE ACTUALLY MEASURED |
| WORK MODE | TORQUE MANAGEMENT MODE | MODE IN WHICH THE MOTOR IS AUTOMATICALLY STOPPED BY THE SHUT-OFF FUNCTION BASED ON A PLURALITY OF PARAMETER VALUES SET IN THE PARAMETER SETTING MODE |
| | NORMAL MODE | MODE IN WHICH THE MOTOR IS STOPPED ACCORDING TO A USER OPERATION |

IMPACT ROTARY TOOL

CROSS-REFERENCE TO RELATED APPLICATIONS

This application is the U.S. National Phase under 35 U.S.C. § 371 of International Application No. PCT/JP2017/043086, filed on Nov. 30, 2017, which claims the benefit of Japanese Application No. 2017-016136, filed on Jan. 31, 2017, the entire contents of each are hereby incorporated by reference.

TECHNICAL FIELD

The present disclosure relates to a rotary impact tool for tightening screw members such as a bolt and a nut with an intermittent rotary impact force.

BACKGROUND ART

A mechanical rotary impact tool tightens a screw member by generating an intermittent rotary impact force in the output shaft by causing a hammer rotated by a motor output to strike the output shaft in the rotational direction. An oil pulse tool, which is a type of rotary impact tools, generates an intermittent rotary impact force in the output shaft by causing a liner rotated by a motor output to create a pressure difference between oil chambers, thereby tightening a screw member. Since a rotary impact tool is used in an assembly factory, etc., the tightening torque of the screw member needs to be accurately managed to reach the target torque value.

In order to increase the precision of managing the tightening torque, it is preferred to provide a torque measurement means in the output shaft and measure the actual tightening torque directly, but this approach has a disadvantage in that the cost and size of the tool are increased. For this reason, rotary impact tools are provided in the related art that are equipped with a shut-off function that stops the motor automatically by estimating that the tightening torque has reached the target torque value.

Patent document 1 discloses a rotary impact tool including: a strike sensor means for sensing a strike from a hammer on an output shaft; an input side rotation speed sensor means for sensing the rotation speed of a driving shaft; an inter-strike output side rotation angle sensing means for sensing the rotation angle of the output shaft between strikes; a calculation means for calculating a tightening torque value by dividing a strike energy calculated form the average rotation speed of the driving shaft between strikes by the inter-strike output side rotation angle; and a control means for stopping a rotational driving unit when the calculated tightening torque becomes equal or greater than a predefined torque value.

Patent document 2 discloses a rotary impact tool including: a seating detection means for detecting the seating of the head of a screw member on a member to which the screw member is tightened; a strike detection means for detecting an strike applied by an impact mechanism; a control means for counting the number of strikes detected by the strike detection means after the seating of the screw member is detected and automatically stopping the motor when the number of strikes counted reaches a predetermined number of strikes.

Patent document 3 discloses a fastener that, in a measurement mode, drives, when a trigger switch is switched to the ON position, a driving source until the trigger switch is switched to the OFF position and measures a drive time elapsed since the occurrence of the initial impact is detected until the trigger switch is switched to the OFF position or the number of times of occurrence of impact forces detected by the sensor since the trigger switch is switched to the ON position until it is switched to the OFF position.

[patent document 1] JP2005-118910
[patent document 2] JP2009-83038
[patent document 3] JP2003-231068

Problem to be Solved by the Invention

In a rotary impact tool that stops the motor automatically when the number of impacts counted after the seating is detected reaches a predetermine number of impacts, the correspondence between a target torque value and a predetermined number of impacts (hereinafter, also referred to as "shut-off impact count") is stored in a master table in the memory. The manufacturer of the rotary impact tool uses a predetermined screw member and a member to which the screw member is tightened to actually measure the shut-off impact count to realize each of a plurality of tightening torque values and creates a master table accordingly. This allows the master table to maintain the shut-off impact count corresponding to each set value of tightening torque.

However, the screw member and the member to which the screw member is tightened that are actually worked may differ from the screw member and the member to which the screw member is tightened used when the master table was created. If the member to which the screw member is tightened in a tightening work is softer than the member to which the screw member is tightened used when the master table was created, for example, the tightening torque value may not reach the target torque value if the rotary impact tool automatically stops the motor rotation when the shut-off impact count maintained in the master table is reached. Conversely, if the member to which the screw member is tightened in a tightening work is harder than the member to which the screw member is tightened used when the master table was created, the tightening torque value may exceed the target torque value if the rotary impact tool automatically stops the motor rotation when the shut-off impact count maintained in the master table is reached.

Some rotary impact tools that are recently available are configured to allow the user to set a plurality of parameter values for torque management before the work, for the purpose of performing a tightening process suitable for the work piece. At a site of work such as an assembly factory where the same tightening work is repeated, the schedule controller sets a plurality of parameter values for obtaining a target torque value in the rotary impact tool and hands the tool over to the worker who will operate line work. Therefore, the schedule controller actually performs a tightening work by setting a plurality of parameter values temporarily, measures the torque value of the tightened screw member, and checks whether the target torque value is obtained, before handing the rotary impact tool over to the worker. If the target torque value is not obtained, the schedule controller reconfigures the parameter values to different values and repeats the check.

Capabilities to set a plurality of parameter values for torque management in a rotary impact tool helps improve the precision of torque management but, on the other hand, makes it difficult for the schedule controller to identify an optimum combination of parameter values. In particular, in the case the actual tightening torque value and the target torque value differ greatly depending on the parameter value set, the schedule controller cannot be sure which parameter should be changed and may require much labor and time to identify an optimum combination of parameter values.

The disclosure addresses the above-described issue, and a general purpose thereof is to provide a technology that makes it easy to set a plurality of parameter values for torque management.

MEANS TO SOLVE THE PROBLEM

A rotary impact tool according to an embodiment of the present disclosure includes: an impact mechanism that generates an intermittent rotary impact force in an output shaft by using a motor output; an impact detection unit that detects an impact applied by the impact mechanism to the output shaft; a mode setting unit that sets a parameter setting mode for setting a plurality of parameter values for torque management or a work mode; a torque estimation unit that calculates a tightening torque value by using a detection result from the impact detection unit; a parameter setting unit that sets a plurality of parameter values in the parameter setting mode; and a control unit that stops, in the work mode a rotation of a motor based on the plurality of parameter values set by the parameter setting unit and in accordance with the tightening torque value calculated by the torque estimation unit, the rotary impact tool further including a work information storage unit that stores, in the parameter setting mode, the tightening torque value calculated by the torque estimation unit during a tightening work according to a user operation. In the parameter setting mode, the parameter setting unit sets the plurality of parameter values based on the tightening torque value stored in the work information storage unit.

BRIEF DESCRIPTION OF THE DRAWINGS

FIG. 3 shows a listing of the operation modes;

MODE FOR CARRYING OUT THE INVENTION

Figure 1:
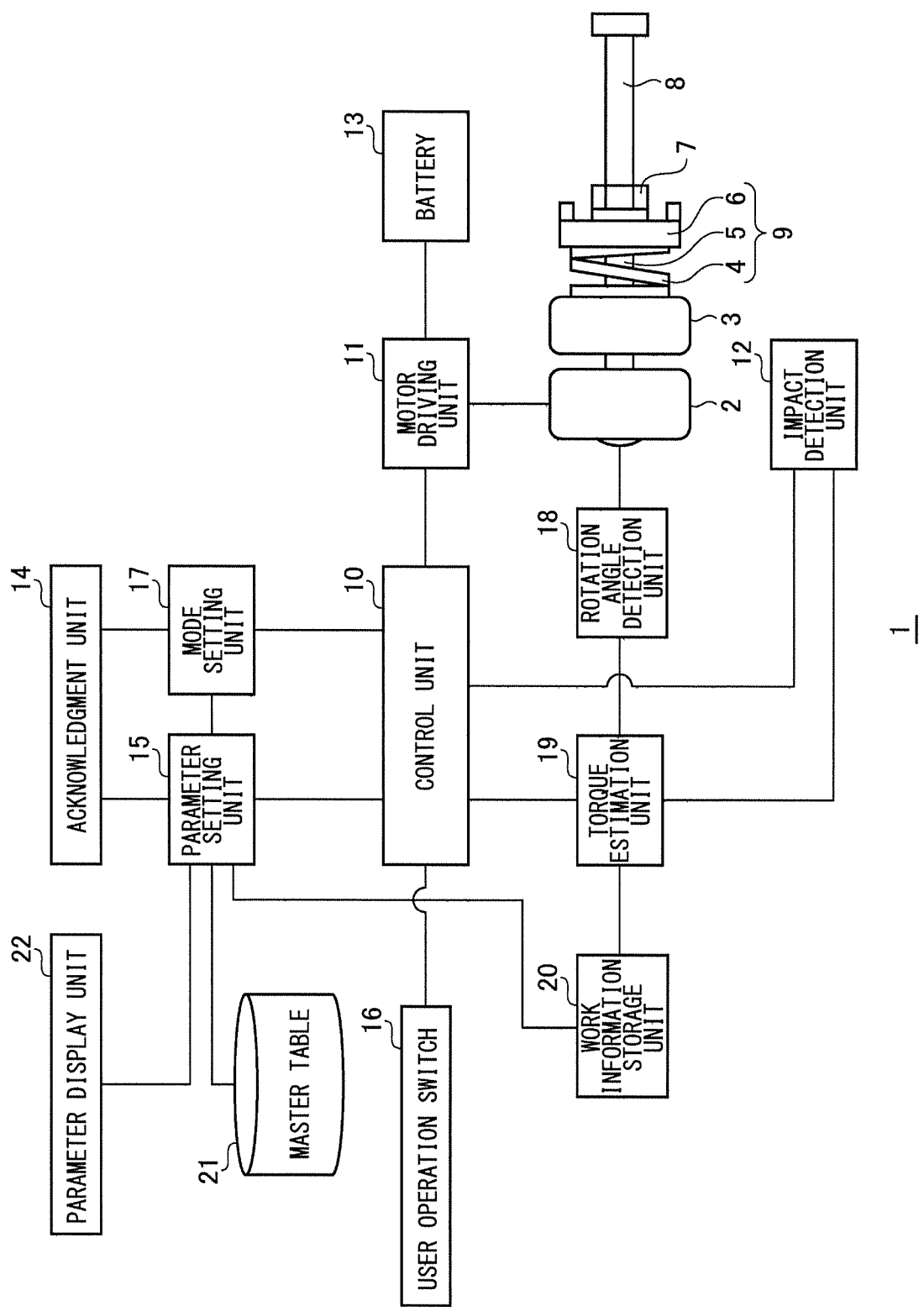
FIG. 1 shows a configuration of a rotary impact tool according to an embodiment.

FIG. 1 shows a configuration of a mechanical rotary impact tool according to an embodiment of the present disclosure. A rotary impact tool 1 is supplied with power from a battery 13 built in a battery pack. A motor 2 as a driving source is driven by a motor driving unit 11. The rotational output of the motor 2 is decelerated by a decelerator 3 and transmitted to a driving shaft 5. A hammer 6 is coupled to the driving shaft 5 via a cam mechanism (not shown), and the hammer 6 is biased by a spring 4 toward an anvil 7 including an output shaft 8.

In the absence of a load of a predetermined value or greater exerted between the hammer 6 and the anvil 7, the hammer 6 and the anvil 7 are engaged in the rotational direction, and the hammer 6 transmits the rotation of the driving shaft 5 to the anvil 7. In the presence of a load of a predetermined value or greater exerted between the hammer 6 and the anvil 7, however, the hammer 6 is caused by the cam mechanism to recede against the spring 4 so that the hammer 6 and the anvil 7 are disengaged. The hammer 6 is then biased by the spring 4 and guided by the cam mechanism to rotate and advance and applies an impact to the anvil 7 in the rotational direction. In the rotary impact tool 1, the spring 4, the driving shaft 5, the hammer 6, and the cam mechanism form an impact mechanism 9 that applies a striking impact to the anvil 7 and the output shaft 8 by using a motor output and generates an intermittent rotary impact force in the anvil 7 and the output shaft 8.

In the rotary impact tool 1, features like a control unit 10, a parameter setting unit 15, a mode setting unit 17, a torque estimation unit 19, etc. are implemented by a microcomputer, etc. carried on a control board. The control unit 10 has the function of controlling the rotation of the motor 2. A user operation switch 16 is a trigger switch manipulated by a user. The control unit 10 turns the motor 2 on or off according to the manipulation of the user operation switch 16 and supplies the motor driving unit 11 with an instruction for driving determined by a manipulation displacement of the user operation switch 16. The motor driving unit 11 controls the voltage applied to the motor 2 according to an instruction for driving supplied from the control unit 10 to adjust the rotation speed of the motor.

An impact detection unit 12 detects an impact applied by the impact mechanism 9 to the output shaft 8. The impact detection unit 12 may include an impact sensor that detects an impact resulting from the hammer 6 striking the anvil 7, and an amplifier for amplifying the output of the impact sensor and supplying the amplified output to the control unit 10 and the torque estimation unit 19. For example, the impact sensor may be a piezoelectric shock sensor that outputs a voltage signal determined by an impact. The amplifier amplifies the output voltage signal and supplies the amplified signal to the control unit 10 and the torque estimation unit 19. The impact detection unit 12 may be configured in an alternative manner. For example, the impact detection unit 12 may be a sound sensor that detects an impact applied by the impact mechanism 9 to the output shaft 8 by detecting impact sound.

The rotation angle detection unit 18 detects the rotation angle of the motor 2 and/or the anvil 7. In the embodiment, the rotation angle detection unit 18 may be a Hall element or a magnetic rotary encoder for detecting the rotation angle of the motor 2. The rotation angle detection unit 18 supplies a motor rotation angle detection signal to the torque estimation unit 19. The torque estimation unit 19 acquires the rotation angle of the anvil 7 from the motor rotation angle detection signal by computation. The torque estimation unit 19 acquires the angle by which the anvil 7 is rotated at each impact applied by the impact mechanism 9. Hereinafter, the angle by which the anvil 7 is rotated at each impact will simply be referred to as "anvil rotation angle".

Figure 2A:
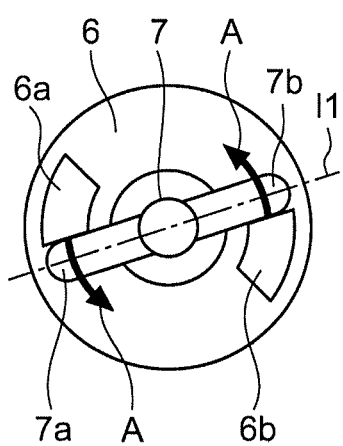
FIGS. 2A-2C show how the hammer applies an impact to the anvil in the rotational direction.
Figure 2B:
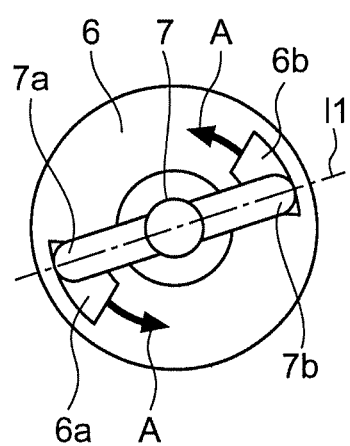
Figure 2C:
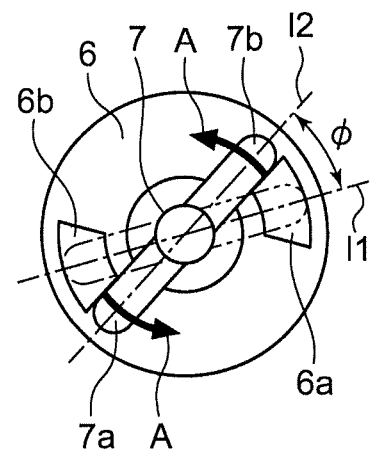

FIGS. 2A-2C show how the hammer 6 applies a strike to the anvil 7 in the rotational direction. The hammer 6 has a pair of hammer claws 6a, 6b projecting from the front face, and the anvil 7 has a pair of anvil claws 7a, 7b extending from the center in the radial direction.

FIG. 2A shows a state in which the hammer claws and the anvil claws are engaged in the circumferential direction. The hammer claw 6a and the hammer claw 6b are engaged with the anvil claw 7a and the anvil claw 7b, respectively, and apply a rotational force in the direction indicated by the arrow A.

FIG. 2B shows a state in which the hammer claws and the anvil claws are disengaged. When a load of a predetermined value or greater is exerted between the hammer 6 and the anvil 7 in the engaged state, the hammer 6 is caused to recede by the cam mechanism (not shown) so that the hammer claw 6a and the anvil claw 7a are disengaged and the hammer claw 6b and the anvil claw 7b are disengaged.

FIG. 2C shows a state in which the hammer claws strike the anvil claws and the anvil 7 is rotated. When the hammer claws 6a, 6b and the anvil claws 7a, 7b are disengaged, the hammer 6 advances and rotates in the direction indicated by the arrow A, causing the hammer claw 6a and the hammer claw 6b to strike the anvil claw 7b and the anvil claw 7a, respectively. The striking impact rotates the anvil 7 by an angle φ formed by l1 and l2. When this occurs, the rotation angle of the hammer 6 will be (π+φ).

The torque estimation unit 19 calculates the tightening torque value T by using the detection result from the impact detection unit 12 and the detection result from the rotation angle detection unit 18.

First, the torque estimation unit 19 uses the following expression (1) to acquire the anvil rotation angle φ per one impact by referring to the motor rotation angle θ between impacts. When the impact detection unit 12 detects an impact applied by the impact mechanism 9, the torque estimation unit 19 derives the anvil rotation angle φ between impacts at a point of time that the impact is detected by referring to the motor rotation angle detection signal.

$$\varphi=(\theta/\eta)-\pi \quad (1)$$

where η denotes a ratio of deceleration induced by the decelerator 3.

The tightening torque of the screw member increases each time the hammer 6 strikes the anvil 7 so that the anvil rotation angle φ acquired at each striking impact after the screw member is seated tends to become smaller progressively.

Denoting the moment of inertia of the anvil 7 and the output shaft 8 by J, and the speed of strike between impacts by ω, the torque estimation unit 19 calculates the tightening torque value T by using the following expression (2).

$$T=(J\times\omega^2)/(2\times\varphi) \quad (2)$$

Thus, the torque estimation unit 19 acquires the anvil rotation angle φ per one impact by using the motor rotation angle θ between impacts. In an alternative example, the rotation angle detection unit 18 may directly detect the rotation angle of the anvil 7. The torque estimation unit 19 acquires the anvil rotation angle φ between impacts based on the anvil rotation angle detection signal supplied from the rotation angle detection unit 18 and calculates the tightening torque value T by using the expression (2).

The rotary impact tool 1 according to the embodiment is configured to include at least "parameter setting mode" and "work mode" as operation modes. As the user selects a mode from, for example, a remote controller, the selected operation mode is set in the rotary impact tool 1. FIG. 3 lists the operation modes in the rotary impact tool.

"Parameter setting mode" is a mode to set a plurality of parameter values for torque management. The parameter setting mode is selected before a work is started and is used by the schedule controller to determine a plurality of parameter values. In the parameter setting mode, the parameter setting unit 15 sets a plurality of parameter values.

"Parameter setting mode" includes "automatic setting mode" and "adjustment mode". Automatic setting mode is a mode to set the initial values of the plurality of parameters automatically based on the estimated torque value calculated in the tightening work according to a user operation. Adjustment mode is a mode to adjust the set values of the plurality of parameters by a user.

"Work mode" is a mode to perform a tightening work. "Work mode" includes "torque management mode" and "normal mode". In the torque management mode, the control unit 10 activates the shut-off function of stopping the rotation of the motor 2 based on the plurality of parameter values set by the parameter setting unit 15 and in accordance with the tightening torque value calculated by the torque estimation unit 19.

In the normal mode, on the other hand, the control unit 10 does not activate the shut-off function. The control unit 10 controls the motor 2 in accordance with the manipulation displacement of the user operation switch 16 manipulated by the user. When the user turns the user operation switch 16 off, the control unit 10 stops the rotation of the motor 2.

When the user uses a remote controller to select a mode, an acknowledgment unit 14 acknowledges a user operation for mode selection. The mode setting unit 17 sets the parameter setting mode or the work mode as the operation mode of the rotary impact tool 1. At a site of work, the schedule controller first selects the automatic setting mode of the parameter setting mode and sets initial values of a plurality of parameters. The schedule controller selects the adjustment mode of the parameter setting mode as necessary to adjust the set values of the plurality of parameters and determine the ultimate set values. When the setting of the plurality of parameter values is terminated, the schedule controller selects the torque management mode of the work mode and hands the tool over to the worker. This prompts the worker to work in a line by using the rotary impact tool 1 in which the optimum parameter values are set. Only the schedule controller may be authorized to select a mode at a site of work, and the worker may not be allowed to select a mode.

In the torque management mode, the rotary impact tool 1 determines the seating of a screw member by using the tightening torque value calculated by the torque estimation unit 19 and performs shut-off control of automatically stopping the rotation of the motor 2 by counting the number of impacts detected by the impact detection unit 12 after the screw member is seated. For this purpose, the rotary impact tool 1 requires the setting of "seating determination level" and "preset number of torque steps" as parameters for torque management.

The seating determination level is a parameter to define a torque value for determination of the seating of a screw member. For example, nine options of selection (L1-L9) are made available. In the presence of a high load during the work due to the attachment of paint or the like on a work piece, it is preferred to set a high seating determination level. In the case of a low load, it is preferred to set a low seating determination level.

The preset number of torque steps is a parameter that defines the number of impacts that should occur after the screw member is seated for stopping the motor 2 automatically (shut-off impact count). For example, 100 selection options (N00-N99) are made available. Each preset number of torque steps corresponds to the number of shut-off impacts after the screw member is seated. For example, N00 may correspond to 10 shut-off impacts, N01 to 12, N02 to 14, and N03 to 16. The parameter values of the seating determination levels and the preset number of torque steps are stored in the master table 21.

The schedule controller should set the "seating determination level" and the "preset number of torque steps" for obtaining the target torque value in the rotary impact tool 1 before the work is started.

Discussed below is the job of the schedule controller of setting the "seating determination level" and the "preset number of torque steps" that are deemed to be proper, performing a tightening work in the torque management mode, and checking whether the tightening torque value that actually occurs (hereinafter, referred to as "actual tightening torque value") matches the target torque value. The schedule controller measures the actual tightening torque of the screw member and confirms that the rotary impact tool 1 can be used in the work directly if the actual tightening torque value matches the target torque value.

However, the actual tightening torque value often does not match the target torque value. The schedule controller reconfigures the seating determination level and/or the preset number of torque steps to a different parameter value(s) and repeats the check. The checking job is repeated until the actual tightening torque value matches the target torque value. Particularly in cases like the rotary impact tool 1 according to the embodiment, where there are plurality of parameters that can be set and there are a large number of selection options for each parameter, it will take much labor and time for the schedule controller to determine the optimum parameter values.

To address the issue, the rotary impact tool 1 according to the embodiment stores work information on the tightening work performed by an experienced person to tighten the screw member (work piece) in the normal mode. The parameter setting mode, which makes it possible to set and adjust the initial values of a plurality of parameters based on the work information, is made available.

When the schedule controller uses the remote controller to select the automatic setting mode of the parameter setting mode, the acknowledgment unit 14 acknowledges the user operation for mode selection from the remote controller, and the mode setting unit 17 sets the operation mode to the automatic setting mode. This causes the parameter setting unit 15 to operate in the automatic setting mode. In the automatic setting mode, the control unit 10 is operated in the normal mode.

In the automatic setting mode, the experienced process administrator performs a tightening work of tightening a work piece in the normal mode, relying on the controller's experience and intuition. In the normal mode, the motor 2 is rotated while the user operation switch 16 is being pulled. When the user operation switch 16 is turned off, the rotation of the motor 2 is stopped. The process administrator turns the user operation switch 16 off when the controller determines that the tightening torque value of the screw member reaches the target torque value. In the automatic setting mode, the fact that the tightening torque value of the screw member tightened by the experienced process administrator reaches the target value or the nearby value is taken advantage of. In the automatic setting mode, a work information storage unit 20 stores the tightening torque value calculated by the torque estimation unit 19 for each impact during the tightening work according to the user operation of the process administrator.

Figure 4:
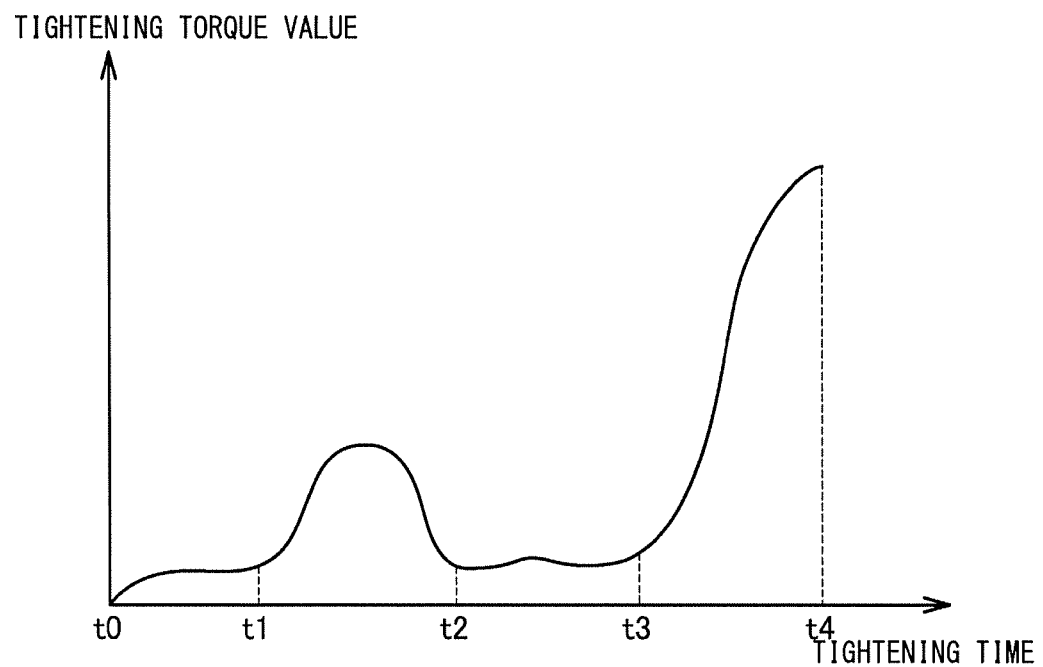
FIG. 4 shows an example of temporal transition of the actual tightening torque value.

FIG. 4 shows an example of temporal transition of the actual tightening torque value in the automatic setting mode. It should be noted that the actual tightening torque values in FIG. 4 are not actually measured in the rotary impact tool 1 but are shown to exemplify a transition in the presence of a load during the work that occurs before the screw member is seated.

In the illustrated tightening work, the process administrator starts pulling the user operation switch 16 at time t0. At time t1, the strike by the hammer 6 is started, and the strike is temporarily terminated at time t2. The strike between time t1 and time t2 is in the presence of the load encountered during the work. Subsequently, at time t3, the strike by the hammer 6 is resumed. At time t4, the process administrator removes the finger from the user operation switch 16 and turns the switch off. This stops the motor rotation and terminates the tightening work. Because the tightening work is performed by the experienced controller, the tightening torque value of the screw member reaches the target torque value or the nearby value when the motor rotation is stopped.

During the tightening work, the torque estimation unit 19 calculates the tightening torque value for each impact by using the detection result from the impact detection unit 12 and the detection result from the rotation angle detection unit 18 and stores the value in the work information storage unit 20. After the tightening work is terminated, the parameter setting unit 15 derives the set values of the plurality of parameters, i.e., the "seating determination level" and the "preset number of torque steps", based on the tightening torque value stored in the work information storage unit 20.

Figure 5:
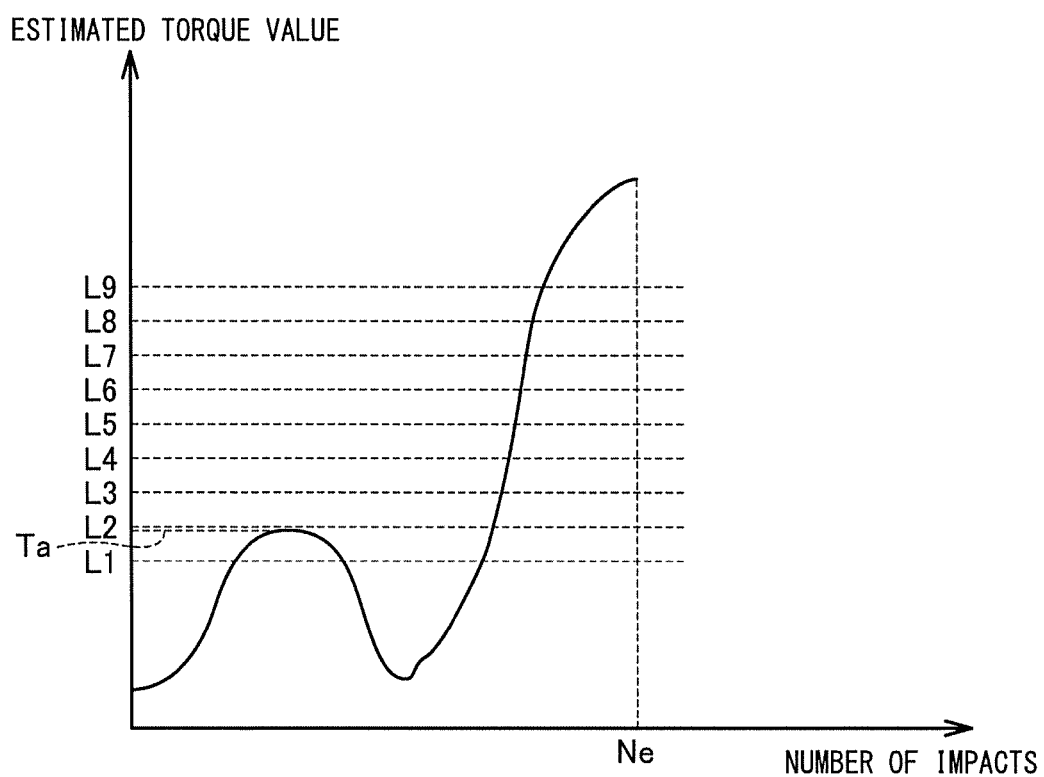
FIG. 5 shows an example of the tightening torque value for each impact stored in the work information storage unit.

FIG. 5 shows an example of the tightening torque value for each impact stored in the work information storage unit 20. FIG. 5 represents the tightening torque value calculated by the torque estimation unit 19 when the actual tightening torque value makes a transition as shown in FIG. 4. In this tightening work, the impact detection unit 12 detects impacts applied by the impact mechanism 9 Ne times.

Of the seating determination level and the preset number of torque steps, the parameter setting unit 15 sets the seating determination level first. In the example shown in FIG. 5, the estimated peak torque value Ta in the presence of a load during the work is larger than L1. The parameter setting unit 15 therefore determines that L1 cannot be set as the seating determination level.

As described above, the torque estimation unit 19 calculates the tightening torque value T by using the expression (2). In the step of tightening a screw member, the anvil rotation angle $\varphi$ between impacts becomes smaller progressively after seating. Therefore, a calculation error by the torque estimation unit 19 is large if the resolution of the rotation angle detection unit 18 is low. It is therefore ideal to set the seating determination level to be the torque value occurring immediately after the screw member is seated. If the torque level L1, i.e., the lowermost seating determination level, is set as the torque value occurring immediately after the screw member is seated, the parameter setting unit 15 may set L2 as the seating determination level. In the presence of a load during the work as shown in FIG. 5, the parameter setting unit 15 may set, as the seating determination level, a torque value (e.g., L3) larger than the estimated peak torque value Ta by a predetermined value or larger, in consideration of the variation in the load during the work.

Figure 6:
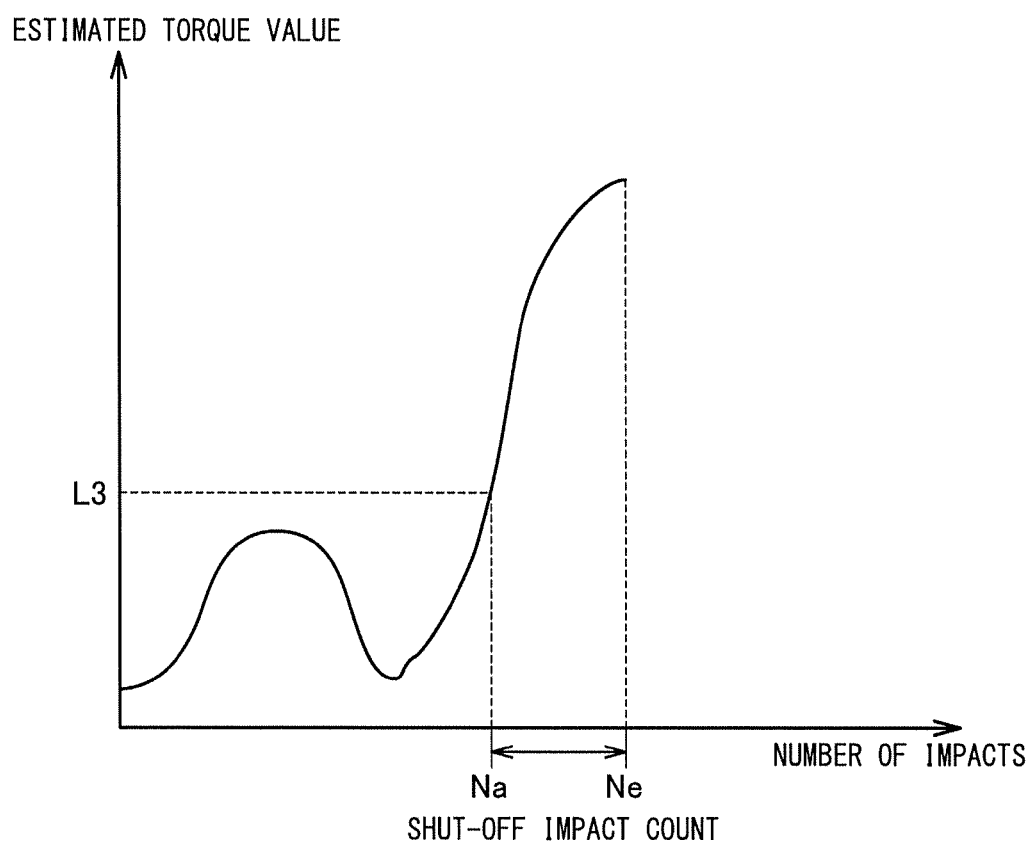
FIG. 6 shows a plurality of parameter values set.

FIG. 6 shows a plurality of parameter values set by the parameter setting unit 15. Upon setting L3 as the seating determination level, the parameter setting unit 15 derives the number of impacts Na that results in the calculated tightening torque value L3. The parameter setting unit 15 defines the number of impacts derived from subtracting the number of impacts Na from the total number of impacts Ne as the shut-off impact count and derives the preset number of torque steps corresponding to the shut-off impact count. Hereinafter, it will be assumed that the preset number of torque steps corresponding to the shut-off impact count of (Ne-Na) times is "N25".

When the parameter setting unit 15 initially sets the seating determination level to "L3" and the preset number of torque steps to "N25", a parameter display unit 22 displays the plurality of parameter values set by the parameter setting unit 15. The parameter display unit 22 may be comprised of a seven-segment display or a liquid crystal display. By causing the parameter display unit 22 to display the plurality of parameter values set by the parameter setting unit 15, the process administrator can know the plurality of parameter values for replicating the actually performed tightening work in the torque management mode.

The process administrator measures the actual tightening torque of the screw member by a known inspection method such as the unwinding torque method, the marking method, and the tightening torque method. When the actual tightening torque value matches the target torque value, the process administrator sets the seating determination level of the rotary impact tool 1 to "L3" and sets the preset number of torque steps to "N25" and hands the tool over to the worker.

Even when the actual tightening torque does not match the target torque value, the actual tightening torque should be near the target torque value because the experienced process administrator has performed the tightening work. When the process administrator uses the remote controller to select the adjustment mode of the parameter setting mode, the acknowledgment unit 14 acknowledges the user operation for mode selection from the remote controller, and the mode setting unit 17 sets the operation mode to the adjustment mode. This causes the parameter setting unit 15 to be operated in the adjustment mode. In the automatic setting mode, the control unit 10 is operates in the torque management mode.

In the adjustment mode, the process administrator uses the remote controller to transmit an instruction to change the parameter value to the rotary impact tool 1. If the actual tightening torque value is smaller than the target torque value, for example, the process administrator inputs an instruction to change to a preset number of torque steps larger than "N25" to the remote controller so as to increase the shut-off impact count in accordance with the difference. Conversely, if the actual tightening torque value is larger than the target torque value, the process administrator inputs an instruction to change to a preset number of torque steps smaller than "N25" to the remote controller so as to decrease the shut-off impact count in accordance with the difference. The acknowledgment unit 14 acknowledges the instruction to change the parameter value from the remote controller, and the parameter setting unit 15 updates the set parameter value in accordance with the instruction for the change from the process administrator. When the parameter setting unit 15 updates the parameter value, the process administrator performs a tightening work by using the rotary impact tool 1 in which the updated parameter value is set, measures the actual tightening torque value of the screw member tightened, and checks whether the actual tightening torque value matches the target torque value.

In the adjustment mode, the control unit 10 acquires the plurality of parameter values updated by the parameter setting unit 15 and controls the rotation of the motor 2 in the torque management mode. A description will be given of a case where the control unit 10 acquires the seating determination level "L3" and the preset number of torque steps "N26". When the process administrator pulls the user operation switch 16, the control unit 10 monitors the tightening torque value calculated by the torque estimation unit 19. When the calculated tightening torque value reaches "L3", the control unit 10 starts counting the number of impacts detected by the impact detection unit 12. When the number of impacts counted reaches the shut-off impact count corresponding to the preset number of torque steps "N26", the control unit 10 automatically stops the rotation of the motor 2.

The process administrator measures the actual tightening torque value of the screw member tightened in the adjustment mode and checks whether the actual tightening torque value matches the target torque value. According to the rotary impact tool 1 of the embodiment, the parameter setting unit 15 automatically sets the plurality of substantively optimum parameter values in the automatic setting mode. Therefore, the process administrator needs only to fine-tune the plurality of automatically set parameter values in the adjustment mode. For this reason, the process administrator in the adjustment mode does not need to repeat the check and can identify the optimum parameter values in a short period of time.

Figure 7:
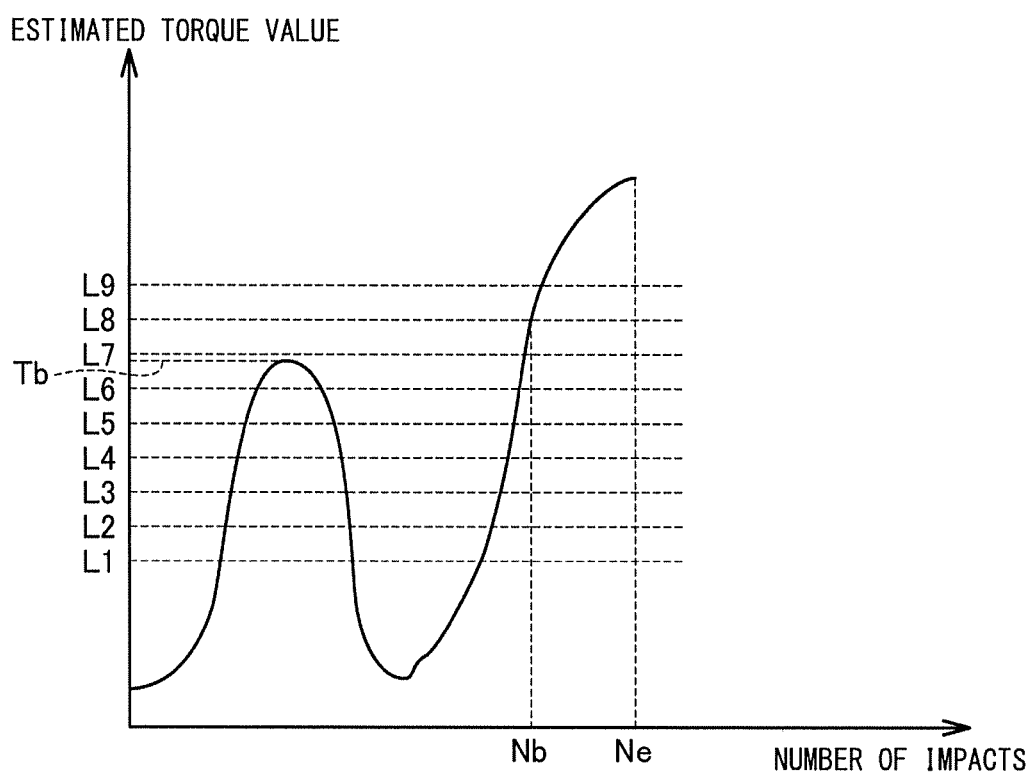
FIG. 7 shows another example of the tightening torque value for each impact stored in the work information storage unit.

FIG. 7 shows another example of the tightening torque value for each impact stored in the work information storage unit 20. In the example shown in FIG. 7, the estimated peak torque value Tb in the presence of a load during the work is larger than L6. For this reason, the parameter setting unit 15 determines that L1-L6 cannot be set as the seating determination level. In this case, the parameter setting unit 15 sets, as the seating determination level, a torque value (e.g., L8) larger than the estimated peak torque value Tb by a predetermined value or larger, in consideration of the variation in the load during the work.

Upon setting L8 as the seating determination level, the parameter setting unit 15 derives the number of impacts Nb that results in the calculated tightening torque value L8. The parameter setting unit 15 defines the number of impacts derived from subtracting the number of impacts Nb from the total number of impacts Ne as the shut-off impact count and derives the preset number of torque steps corresponding to the shut-off impact count. It will be assumed that the preset number of torque steps corresponding to the shut-off impact count of (Ne-Nb) times is "N15".

When the parameter setting unit 15 initially sets the seating determination level to "L8" and the preset number of torque steps to "N15", the parameter display unit 22 displays the plurality of parameter values set by the parameter setting unit 15. The process administrator then measures the actual tightening torque value. When the actual tightening torque value matches the target torque value, the process administrator finalizes the seating determination level "L8" and the preset number of torque steps "N15". If they do not match, the process administrator fine-tunes the parameter values and performs a check.

Figure 8:
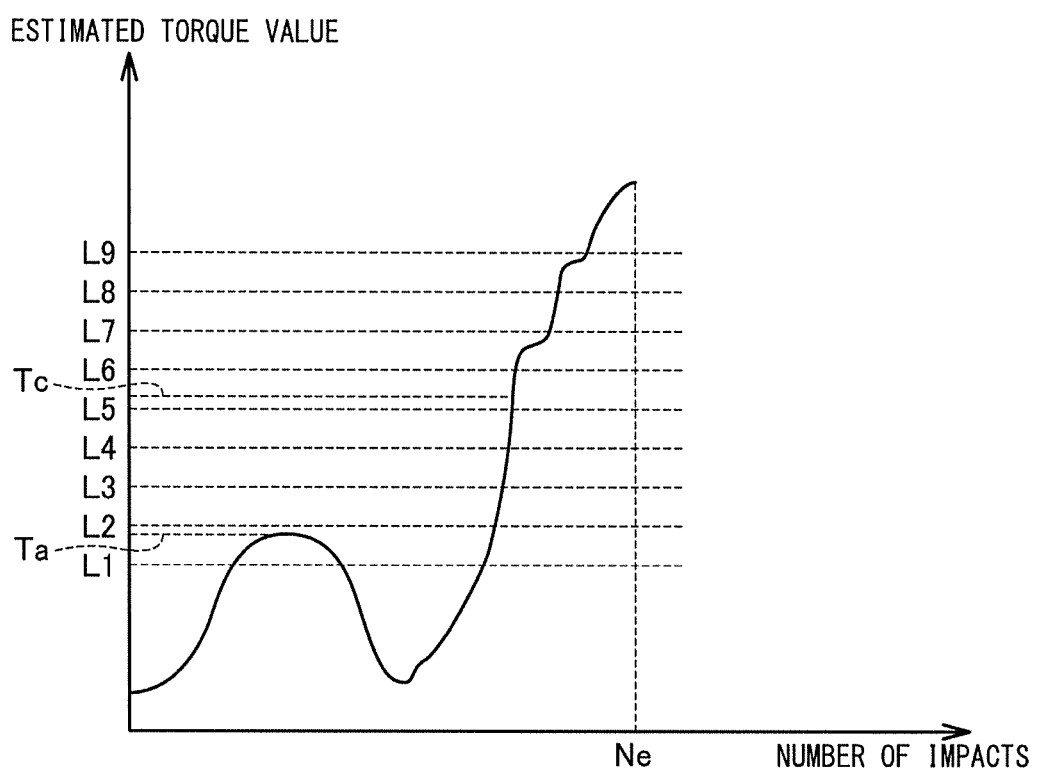
FIG. 8 shows still another example of the tightening torque value for each impact stored in the work information storage unit.

FIG. 8 shows still another example of the tightening torque value for each impact stored in the work information storage unit 20. In the example shown in FIG. 8, the estimated peak torque value Ta in the presence of a load during the work is larger than L1. Further, the results of calculation are not obtained in a stable manner at the estimated torque value Tc and larger. As described above, one of the factors for this is that the anvil rotation angle φ cannot be determined accurately if the resolution of the rotation angle detection unit 18 is low.

The parameter setting unit 15 determines that L1 cannot be set as the seating determination level and the torque value of Tc or larger, which are not estimated in a stable manner, cannot be set as the seating determination level, either. In this case, the parameter setting unit 15 may set L3 as the seating determination level, as in the example shown in FIG. 6.

The description above relates to a tightening work in a single site of work. In a work in a line, however, a plurality of screw members are often tightened in a predetermined sequence on a surface of a single member to which the screw member is tightened. In this case, the portion where a screw member is tightened earlier sags relative to the other portions to cause a portion where a screw member is tightened later to be inclined slightly from the original state. This may increase a load during the work encountered by the screw member tightened later due to the inclination of the member to which the screw member is tightened. Thus, in the step of tightening a plurality of screw members in a predetermined sequence on a surface of a single member to which the screw member is tightened, the process administrator may perform a plurality of tightening works of screw members in a predetermined sequence in the parameter setting mode, and the parameter setting unit 15 may set a plurality of optimum parameter values for each of the plurality of tightening works.

The parameter setting unit 15 sets parameter values for each work sequence and stores the parameter values in a memory (not shown). In the torque management mode, the control unit 10 acquires the parameter values for each work sequence from the parameter setting unit 15 and controls the rotation of the motor 2 by using the parameter values associated with the work sequence. By allowing the parameter setting unit 15 to set a plurality of parameter values for each of the plurality of tightening works, the control unit 10 can perform highly precise torque management by using optimum parameter values for each screw member.

The rotary impact tool 1 is described as requiring the setting of the "seating determination level" and the "preset number of torque steps" as parameters for torque management. Alternatively, the rotary impact tool 1 may further require the setting of the "motor rotation speed". Particularly in the case of a tightening work of a small screw member, it is preferred that the target tightening torque value be small and the motor rotation speed be low. It is therefore suitable for the rotary impact tool 1 to require the setting of the "motor rotation speed". In the parameter setting mode, the work information storage unit 20 stores the motor rotation speed during the tightening work. After the tightening work by the process administrator is terminated, the parameter display unit 22 displays the motor rotation speed. The motor rotation speed displayed is configured to be modifiable by the process administrator in the adjustment mode. In the work mode, it is not easy for the process administrator to adjust the manipulation displacement of the user operation switch 16 to maintain a low motor rotation speed. Therefore, the parameter setting unit 15 may set a constant motor rotation speed in response to an instruction from the process administrator and store the motor rotation speed in the work information storage unit 20.

Described above is an explanation based on an exemplary embodiment. The embodiment is intended to be illustrative only and it will be understood by those skilled in the art that various modifications to constituting elements and processes could be developed and that such modifications are also within the scope of the present invention.

The rotary impact tool 1 according to the embodiment requires the "seating determination level" and the "preset number of torque steps" as parameters for torque management. In one variation, the rotary impact tool 1 may require the "target torque value" and the "motor rotation speed" as parameters for torque management on the condition that the resolution of the rotation angle detection unit 18 is high. In this variation, the control unit 10 may perform shut-off control of stopping the rotation of the motor 2 when the tightening torque value calculated by the torque estimation unit 19 reaches the target torque value.

The rotary impact tool 1 according to the embodiment has the electric motor 2 as a driving source, but may alternatively has a motor of other types (e.g., an air motor) mounted thereon. The rotary impact tool 1 according to the embodiment is a mechanical rotary tool, but may be a rotary impact tool of other types (e.g., an oil pulse tool).

An embodiment of the present invention is summarized below.

A rotary impact tool (1) according to an embodiment of the disclosure includes: an impact mechanism (9) that generates an intermittent rotary impact force in an output shaft (8) by using a motor output; an impact detection unit (12) that detects an impact applied by the impact mechanism to the output shaft; a mode setting unit (17) that sets a parameter setting mode for setting a plurality of parameter values for torque management or a work mode; a torque estimation unit (19) that calculates a tightening torque value by using a detection result from the impact detection unit; a parameter setting unit (15) that sets a plurality of parameter values in the parameter setting mode; and a control unit (10) that stops, in the work mode a rotation of a motor based on the plurality of parameter values set by the parameter setting unit and in accordance with the tightening torque value calculated by the torque estimation unit. The rotary impact tool (1) further includes a work information storage unit (20) that stores, in the parameter setting mode, the tightening torque value calculated by the torque estimation unit during a tightening work according to a user operation. The parameter setting unit (15) may set the plurality of parameter values based on the tightening torque value stored in the work information storage unit (20).

The torque estimation unit (19) may calculate the tightening torque value for each impact applied by the impact mechanism to the output shaft, and the work information storage unit (20) may store the tightening torque value calculated for each impact.

The parameter setting unit (15) may set at least a seating determination level that is a torque value for determination of seating and a preset number of torque steps corresponding to a shut-off impact count of the impact mechanism after the seating. The parameter setting unit (15) may set at least a target torque value that is a torque value for determination of termination of tightening.

The rotary impact tool (1) may further include a parameter display unit (22) that display the plurality of parameter values set by the parameter setting unit. The rotary impact tool (1) may further include: an acknowledgment unit (14) that acknowledges an instruction to change a parameter value from a user, and the parameter setting unit (15) may update a set parameter value in accordance with an instruction to change the parameter value from the user. The parameter setting unit (15) may be capable of setting a plurality of parameter values for each of a plurality of tightening works.

DESCRIPTION OF THE REFERENCE NUMERALS

1 . . . rotary impact tool, 2 . . . motor, 9 . . . impact mechanism, 10 . . . control unit, 11 . . . motor driving unit, 12 . . . impact detection unit, 13 . . . battery, 14 . . . acknowledgment unit, 15 . . . parameter setting unit, 16 . . . user operation switch, 17 . . . mode setting unit, 18 rotation angle detection unit, 19 . . . torque estimation unit, 20 . . . work information storage unit, 21 . . . master table, 22 . . . parameter display unit

INDUSTRIAL APPLICABILITY

The embodiment described in the present disclosure can be used in the field of rotary impact tools.

The invention claimed is:

1. A rotary impact tool comprising:
an impact mechanism that includes a motor, an anvil and a driving shaft, the impact mechanism applies multiple impacts to an output shaft and generates intermittent rotary impact forces on the output shaft by using a motor output from the motor;
an impact sensor that detects the impacts applied by the impact mechanism to the output shaft;
a rotation angle detector that detects a rotation angle of the motor or the anvil;
a microcomputer programmed to perform as:
a mode setting unit that sets a parameter setting mode for setting a plurality of parameter values for torque management or a work mode;
a torque estimation unit that calculates a tightening torque value by using a detection result from the impact sensor and a detection result from the rotation angle detector;
a parameter setting unit that sets a plurality of parameter values in the parameter setting mode; and
a control unit that stops, in the work mode, a rotation of the motor based on the plurality of parameter values set by the parameter setting unit and in accordance with the tightening torque value calculated by the torque estimation unit; and
a memory that stores, in the parameter setting mode, the tightening torque value calculated by the torque estimation unit during a tightening work according to a user operation, wherein:
the parameter setting unit, in the parameter setting mode, calculates and sets a seating determination level that is a torque value for determination of seating and a preset number of torque steps corresponding to a shut-off impact count of the impact mechanism after the seating based on the tightening torque value stored in the memory,
the torque estimation unit, in the parameter setting mode, calculates the tightening torque value for each of the multiple impacts applied by the impact mechanism to the output shaft,
the memory stores, in the parameter setting mode, the tightening torque value calculated for each of the multiple impacts, and
the control unit that stops, in the work mode, the rotation of the motor based on the plurality of parameter values set by the parameter setting unit and in accordance with the tightening torque value stored in the memory.

2. The rotary impact tool according to claim 1, further comprising a display that displays the seating determination level and the preset number of torque steps set by the parameter setting unit.

3. The rotary impact tool according to claim 2,
wherein the microcomputer is further programmed to perform as an acknowledgment unit that acknowledges an instruction to change at least one of the plurality of parameter values from a user, and
wherein the parameter setting unit updates the at least one of the plurality of parameter values in accordance with the instruction from the user.

4. The rotary impact tool according to claim 1, wherein the parameter setting unit is configured to calculate and set the seating determination level and the preset number of torque steps for each of a plurality of tightening works.

* * * * *